(12) United States Patent
Gusarov

(10) Patent No.: US 11,354,884 B2
(45) Date of Patent: Jun. 7, 2022

(54) COLOR EXTRACTION OF A VIDEO STREAM

(71) Applicant: Snap Inc., Santa Monica, CA (US)

(72) Inventor: Maksim Igorevich Gusarov, Saratov (RU)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/014,682

(22) Filed: Sep. 8, 2020

(65) Prior Publication Data

US 2020/0401838 A1 Dec. 24, 2020

Related U.S. Application Data

(63) Continuation of application No. 16/414,295, filed on May 16, 2019, now Pat. No. 10,803,342, which is a continuation of application No. 14/994,946, filed on Jan. 13, 2016, now Pat. No. 10,339,410.

(51) Int. Cl.
*G06V 10/56* (2022.01)
*G06T 3/20* (2006.01)
*G06T 7/00* (2017.01)
*G06V 10/50* (2022.01)

(52) U.S. Cl.
CPC ............... *G06V 10/56* (2022.01); *G06T 3/20* (2013.01); *G06T 7/0079* (2013.01); *G06V 10/50* (2022.01); *G06T 2207/10016* (2013.01); *G06T 2207/10024* (2013.01)

(58) Field of Classification Search
CPC ............... G06K 9/4652; G06K 9/4642; G06K 9/00744; G06T 3/20; G06T 7/0079; G06T 2207/10016; G06T 2207/10024; G06V 10/56; G06V 10/50; G06V 20/46
See application file for complete search history.

(56) References Cited

U.S. PATENT DOCUMENTS

| 4,805,016 A | 2/1989 | Kato |
| 5,802,361 A | 9/1998 | Wang et al. |
| 6,038,295 A | 3/2000 | Mattes |
| 6,151,136 A | 11/2000 | Takemoto |
| 6,704,445 B1 | 3/2004 | Gonsalves |
| 6,980,909 B2 | 12/2005 | Root et al. |
| 7,057,768 B2 | 6/2006 | Zaklika et al. |

(Continued)

FOREIGN PATENT DOCUMENTS

CA 2887596 A1 7/2015

OTHER PUBLICATIONS

"U.S. Appl. No. 14/994,946, Final Office Action dated Feb. 8, 2018", 15 pgs.

(Continued)

*Primary Examiner* — Xuemei G Chen
(74) *Attorney, Agent, or Firm* — Schwegman Lundberg & Woessner, P.A.

(57) ABSTRACT

Systems, devices, media, and methods are presented for segmenting an image of a video stream with a client device, extracting one or more color from the image and modifying the video stream. The systems, devices, and method convert images of the set of images to a coordinate representation, perform a histogram equalization, identifies one or more colors of the coordinate representation based on an area of interest, determines a prevailing color, and applies the prevailing color to pixels of the video stream.

20 Claims, 9 Drawing Sheets

(56) References Cited

U.S. PATENT DOCUMENTS

| | | | |
|---|---|---|---|
| 7,173,651 B1 | 2/2007 | Knowles | |
| 7,327,879 B2* | 2/2008 | Nako | H04N 1/4092 |
| | | | 382/167 |
| 7,411,493 B2 | 8/2008 | Smith | |
| 7,535,890 B2 | 5/2009 | Rojas | |
| 7,663,597 B2 | 2/2010 | Plut | |
| 7,702,149 B2 | 4/2010 | Ohkubo et al. | |
| 8,131,597 B2 | 3/2012 | Hudetz | |
| 8,199,747 B2 | 6/2012 | Rojas et al. | |
| 8,332,475 B2 | 12/2012 | Rosen et al. | |
| 8,515,172 B2* | 8/2013 | Varekamp | G06T 7/136 |
| | | | 382/173 |
| 8,532,336 B2 | 9/2013 | Bobbitt et al. | |
| 8,594,421 B2 | 11/2013 | Adachi | |
| 8,620,076 B2 | 12/2013 | Omori | |
| 8,660,319 B2 | 2/2014 | Aarabi | |
| 8,718,333 B2 | 5/2014 | Wolf et al. | |
| 8,724,622 B2 | 5/2014 | Rojas | |
| 8,874,677 B2 | 10/2014 | Rosen et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,165,210 B1 | 10/2015 | Srinivasan | |
| 9,189,886 B2 | 11/2015 | Black et al. | |
| 9,191,776 B2 | 11/2015 | Root et al. | |
| 9,204,252 B2 | 12/2015 | Root et al. | |
| 9,251,405 B2 | 2/2016 | Bathiche et al. | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,514,225 B2 | 12/2016 | Cho et al. | |
| 9,582,853 B1* | 2/2017 | Oh | G06T 3/4015 |
| 9,774,926 B1* | 9/2017 | Greenfield | H04N 21/8355 |
| 9,928,874 B2 | 3/2018 | Shaburova | |
| 10,198,819 B2 | 2/2019 | Kudriashov et al. | |
| 10,339,410 B1 | 7/2019 | Gusarov | |
| 10,609,324 B2 | 3/2020 | Monastyrshyn et al. | |
| 2002/0029384 A1* | 3/2002 | Griggs | H04N 21/25841 |
| | | | 725/46 |
| 2003/0076417 A1* | 4/2003 | Thomas | G07B 15/063 |
| | | | 348/169 |
| 2003/0185437 A1* | 10/2003 | Nakami | H04N 1/6058 |
| | | | 382/162 |
| 2004/0047504 A1 | 3/2004 | Suzuki et al. | |
| 2004/0119995 A1* | 6/2004 | Nishi | H04N 1/6027 |
| | | | 358/1.9 |
| 2005/0117798 A1 | 6/2005 | Patton et al. | |
| 2006/0204082 A1 | 9/2006 | Boregowda et al. | |
| 2006/0230414 A1* | 10/2006 | Zhang | G11B 27/22 |
| | | | 725/17 |
| 2006/0257039 A1 | 11/2006 | Matsuhira | |
| 2007/0052839 A1 | 3/2007 | Kong et al. | |
| 2008/0051648 A1* | 2/2008 | Suri | A61B 6/5235 |
| | | | 600/407 |
| 2008/0118153 A1* | 5/2008 | Wu | G06K 9/00711 |
| | | | 382/190 |
| 2009/0256916 A1 | 10/2009 | Tanaka | |
| 2009/0290049 A1 | 11/2009 | Ukita | |
| 2010/0033457 A1* | 2/2010 | Kim | H04N 5/58 |
| | | | 345/207 |
| 2011/0003372 A1* | 1/2011 | Jeon | B01F 13/0059 |
| | | | 435/287.3 |
| 2011/0043535 A1 | 2/2011 | Kwiatkowski et al. | |
| 2011/0058188 A1* | 3/2011 | Guo | H04N 1/32277 |
| | | | 358/1.9 |
| 2011/0063468 A1* | 3/2011 | Ahn | G06K 9/3258 |
| | | | 348/222.1 |
| 2011/0202598 A1 | 8/2011 | Evans et al. | |
| 2012/0051658 A1 | 3/2012 | Tong et al. | |
| 2012/0209924 A1 | 8/2012 | Evans et al. | |
| 2013/0010094 A1* | 1/2013 | Satish | G06T 5/00 |
| | | | 348/77 |
| 2013/0154985 A1 | 6/2013 | Miyazaki | |
| 2013/0155330 A1 | 6/2013 | Longhurst et al. | |
| 2014/0079295 A1* | 3/2014 | Yoon | A61B 5/1176 |
| | | | 382/115 |
| 2014/0201527 A1 | 7/2014 | Krivorot | |
| 2014/0301640 A1* | 10/2014 | Hirano | G06T 5/002 |
| | | | 382/165 |
| 2014/0347385 A1* | 11/2014 | Akenine-Moller | G06T 15/503 |
| | | | 345/611 |
| 2014/0348428 A1 | 11/2014 | Lee | |
| 2014/0368885 A1 | 12/2014 | Ido | |
| 2015/0117772 A1 | 4/2015 | Yang et al. | |
| 2015/0199819 A1 | 7/2015 | Suzuki et al. | |
| 2015/0281476 A1 | 10/2015 | Watanabe | |
| 2015/0310655 A1 | 10/2015 | Hill et al. | |
| 2015/0339828 A1* | 11/2015 | Djelouah | G06T 7/11 |
| | | | 382/173 |
| 2016/0224833 A1* | 8/2016 | Jin | G06V 10/25 |
| 2016/0241917 A1 | 8/2016 | Didomenico | |
| 2017/0070719 A1 | 3/2017 | Smolic et al. | |
| 2017/0154399 A1* | 6/2017 | Oliveira da Silva | |
| | | | G06T 1/0028 |
| 2019/0102644 A1 | 4/2019 | Wilbert et al. | |

OTHER PUBLICATIONS

"U.S. Appl. No. 14/994,946, Non Final Office Action dated Jul. 3, 2017", 17 pgs.

"U.S. Appl. No. 14/994,946, Non Final Office Action dated Oct. 3, 2018", 16 pgs.

"U.S. Appl. No. 14/994,946, Notice of Allowance dated Feb. 21, 2019", 11 pgs.

"U.S. Appl. No. 14/994,946, Response filed Aug. 8, 2018 to Final Office Action dated Feb. 8, 2018", 12 pgs.

"U.S. Appl. No. 14/994,946, Response filed Oct. 29, 2018 to Non Final Office Action dated Oct. 3, 2018", 10 pgs.

"U.S. Appl. No. 141994,946, Response filed Dec. 4, 2017 to Non Final Office Action dated Jul. 3, 2017", 15 pgs.

"U.S. Appl. No. 16/414,295, Final Office Action dated Apr. 29, 2020", 19 pgs.

"U.S. Appl. No. 16/414,295, Final Office Action dated Oct. 21, 2019", 20 pgs.

"U.S. Appl. No. 16/414,295, Non Final Office Action dated Jan. 24, 2020", 18 pgs.

"U.S. Appl. No. 16/414,295, Non Final Office Action dated Jul. 10, 2019", 18 pgs.

"U.S. Appl. No. 16/414,295, Notice of Allowance dated Jun. 10, 2020", 10 pgs.

"U.S. Appl. No. 16/414,295, Response filed Jan. 14, 2020 to Final Office Action dated Oct. 21, 2019", 10 pgs.

"U.S. Appl. No. 16/414,295, Response filed Apr. 8, 2020 to Non Final Office Action dated Jan. 24, 2020", 11 pgs.

"U.S. Appl. No. 16/414,295, Response filed Jun. 2, 2020 to Final Office Action dated Apr. 29, 2020", 10 pgs.

"U.S. Appl. No. 16/414,295, Response filed Oct. 8, 2019 to Non-Final Office Action dated Jul. 10, 2019", 10 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

* cited by examiner

COLOR EXTRACTION OF A VIDEO STREAM

PRIORITY

This application is a continuation of and claims the benefit of priority of U.S. patent application Ser. No. 16/414,295, filed on May 16, 2019, which is a continuation of and claims the benefit of priority of U.S. patent application Ser. No. 14/994,946, filed on Jan. 3, 2016, each of which is hereby incorporated by reference herein in their entireties.

TECHNICAL FIELD

Embodiments of the present disclosure relate generally to automated image segmentation of a video stream. More particularly, but not by way of limitation, the present disclosure addresses systems and methods for image segmentation to modify color values for images of the video stream.

BACKGROUND

Telecommunications applications and devices can provide communication between multiple users using a variety of media, such as text, images, sound recordings, and/or video recording. For example, video conferencing allows two or more individuals to communicate with each other using a combination of software applications, telecommunications devices, and a telecommunications network. Telecommunications devices may also record video streams to transmit as messages across a telecommunications network.

BRIEF DESCRIPTION OF THE DRAWINGS

Various ones of the appended drawings merely illustrate example embodiments of the present disclosure and should not be considered as limiting its scope.

Figure 1:
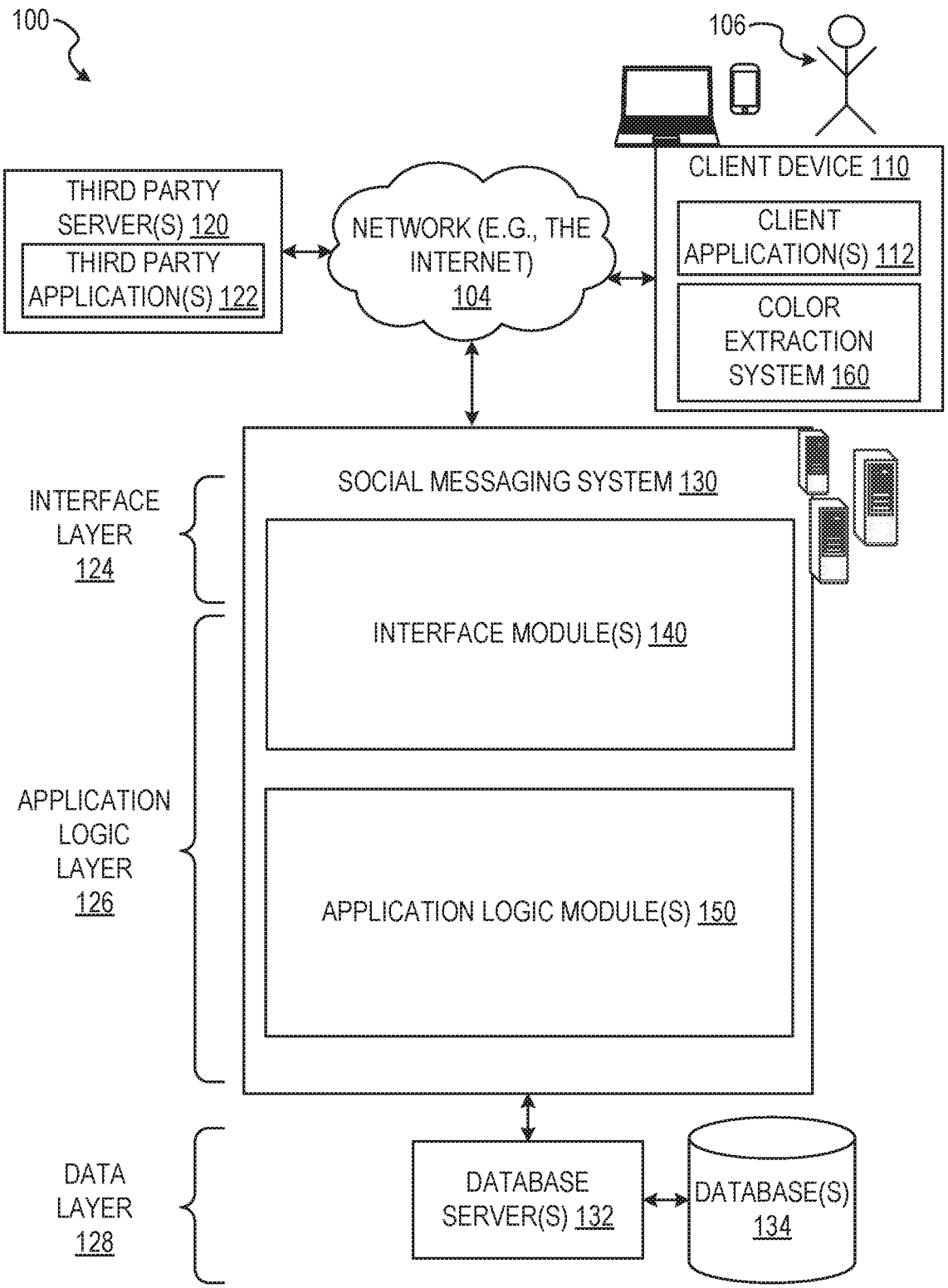
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Although telecommunications applications and devices exist to provide two way video communication between two devices, there can be issues with video streaming, such as modifying images within the video stream during a communication session. Image capture devices, capturing the video stream during communication may be subject to poor or uneven lighting conditions, or provide images which otherwise have unsatisfactory color ratios, temperatures, and the like. Methods generally accepted for editing or modifying video do not modify video or video communications as the video is being captured or the video communication is conducted or are incapable of providing color adjustment or correction based on extracted and corrected colors. Further, modifying colors for desired effect may not be performed, in generally accepted methods, by an automated system based on the video stream being captured by the system. Accordingly, there is still a need in the art to improve video communications between devices.

Embodiments of the present disclosure relate generally to automated image segmentation and color extraction of a video stream. Some embodiments relate to color extraction and modification of identified areas of interest within a face depicted in a video stream. For example, in one embodiment, a user of a client device may open an application operating on the client device and receiving video captured by the device. The video captured by the device is a video stream such as a video conference or video chat between mobile devices. The application identifies an area of skin below the eyes of the face depicted within the video stream. The application corrects the color of the skin to identify a prevailing color for the skin. While receiving the video stream from a camera of the client device and transmitting the video stream to another mobile device, the application corrects the color of the skin within the video stream and modifies the remaining colors within the video stream to correct the color of the video stream in reference to the corrected skin color. The mobile device receiving the video conference streaming from the mobile device running the application displays the color corrected video stream within the video chat. The application can also extract colors and apply modified versions of the prevailing color to the video stream to match or support a theme or an effect.

The above is one specific example. The various embodiments of the present disclosure relate to devices and instructions by one or more processors of a device to modify a video stream transmitted by the device to another device while the video stream is being captured (e.g., modifying a video stream in real time). A color extraction system is described that identifies and tracks objects of interest across a video stream and through a set of images comprising the video stream. In various example embodiments, the color extraction system identifies and tracks one or more facial features depicted in a video stream. Although described with respect to facial features, it should be understood that the image segmentation system may track, extract colors for, and modify colors of any object of interest, as discussed below.

The color extraction system receives the video stream from an imaging device and identifies an approximate location of an object of interest within images of the video stream. An area of interest is identified around the object of interest. In some embodiments, images containing the object of interest are cropped in a portion of the video stream to remove image data outside the area of interest. The color extraction system may perform one or more image processing operations on the set of images of the video stream to generate a coordinate representation, perform histogram equalization of the coordinate representation, identify a color within the area of interest. The color extraction system may also correct or otherwise modify the image based on the color and the image processing operations. In some embodiments, the color extraction system extracts the color from the area of interest, processed by one or more operations, and transfers the extracted color to another video stream transmitted to another client device.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions and the corresponding hardware (e.g., memory and processor) for executing the instructions, forming a hardware-implemented module or engine and acting, at the time of the execution of instructions, as a special purpose machine configured to carry out a particular set of functions. To avoid obscuring the inventive subject matter with unnecessary detail, various functional modules and engines that are not germane to conveying an understanding of the inventive subject matter have been omitted from FIG. 1. Of course, additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface modules (e.g., a web server) 140, which receives requests from various client-computing devices and servers, such as client devices 110 executing client application(s) 112, and third party servers 120 executing third party application(s) 122. In response to received requests, the interface module 140 communicates appropriate responses to requesting devices via a network 104. For example, the interface modules 140 can receive requests such as Hypertext Transfer Protocol (HTTP) requests, or other web-based, Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client devices 110 form all or part of an color extraction system 160 such that modules of the color extraction system 160 configure the client device 110 to perform a specific set of functions with respect to operations of the color extraction system 160.

In an example, the client devices 110 are executing the client application(s) 112. The client application(s) 112 can provide functionality to present information to a user 106 and communicate via the network 104 to exchange information with the social messaging system 130. Further, in some examples, the client devices 110 execute functionality of the color extraction system 160 to segment images of video streams during capture of the video streams and transmit the video streams (e.g., with image data modified based on the segmented images of the video stream).

Each of the client devices 110 can comprise a computing device that includes at least a display and communication capabilities with the network 104 to access the social messaging system 130, other client devices, and third party servers 120. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client devices 110. In some embodiments, the user 106 interacts with the social messaging system 130 via the client devices 110. The user 106 may not be part of the networked environment, but may be associated with the client devices 110.

As shown in FIG. 1, the data layer 128 has database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts)

on the social messaging system 130 and interact with a broad range of applications provided by the social messaging system 130.

The application logic layer 126 includes various application logic modules 150, which, in conjunction with the interface modules 140, generate various user interfaces with data retrieved from various data sources or data services in the data layer 128. Individual application logic modules 150 may be used to implement the functionality associated with various applications, services, and features of the social messaging system 130. For instance, a social messaging application can be implemented with of the application logic modules 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic modules 150.

As illustrated in FIG. 1, the social messaging system 130 may include at least a portion of the color extraction system 160 capable of identifying, tracking, and modifying video data during capture of the video data by the client device 110. Similarly, the client device 110 includes a portion of the color extraction system 160, as described above. In other examples, client device 110 may include the entirety of color extraction system 160. In instances where the client device 110 includes a portion of (or all of) the color extraction system 160, the client device 110 can work alone or in cooperation with the social messaging system 130 to provide the functionality of the color extraction system 160 described herein.

In some embodiments, the social messaging system 130 may be an ephemeral message system that enables ephemeral communications where content (e.g. video clips or images) are deleted following a deletion trigger event such as a viewing time or viewing completion. In such embodiments, a device uses the various modules described herein within the context of any of generating, sending, receiving, or displaying aspects of an ephemeral message. For example, a device implementing the color extraction system 160 may identify, track, and modify an object of interest, such as pixels representing skin on a face depicted in the video clip. The device may modify the object of interest during capture of the video clip without image processing after capture of the video clip as a part of a generation of content for an ephemeral message.

Figure 2:
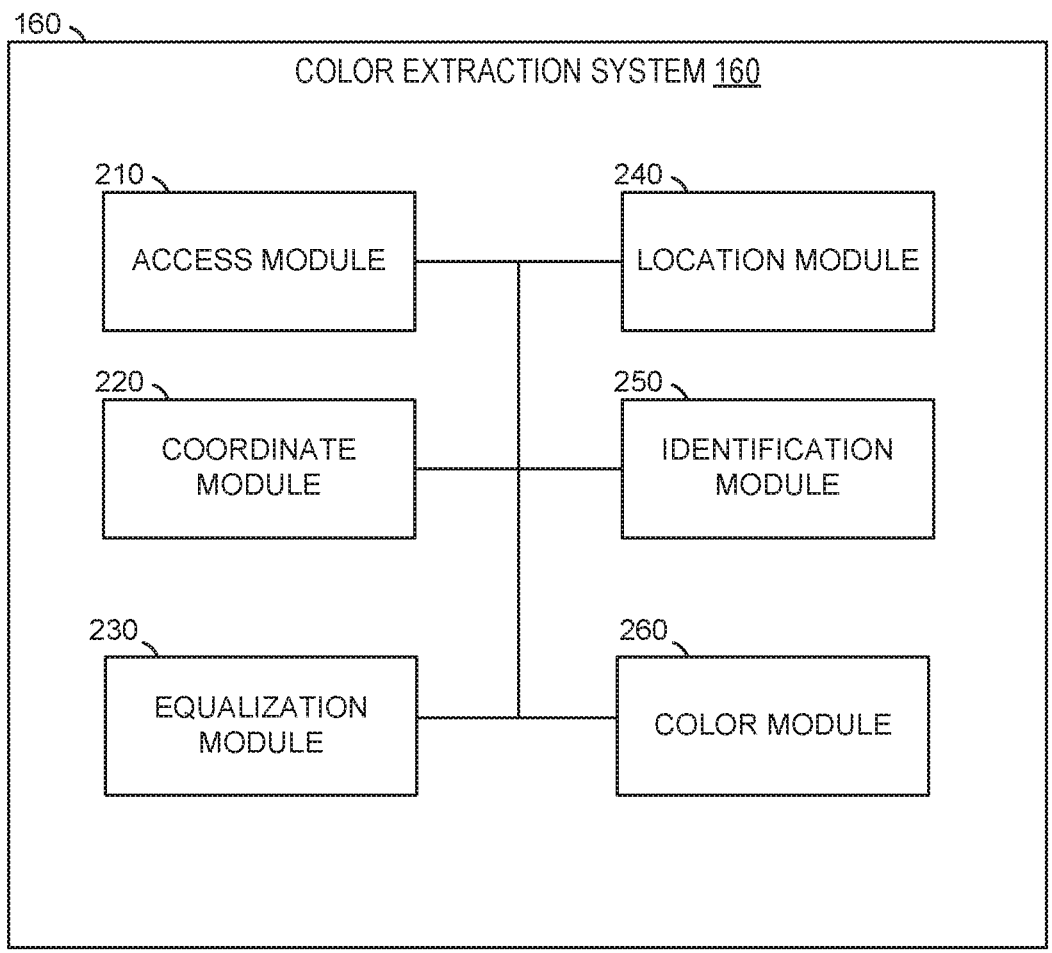
FIG. 2 is a diagram illustrating a color extraction system, according to some example embodiments.

In FIG. 2, in various embodiments, the color extraction system 160 can be implemented as a standalone system or implemented in conjunction with the client device 110, and is not necessarily included in the social messaging system 130. The color extraction system 160 is shown to include an access module 210, a coordinate module 220, an equalization module 230, a location module 240, an identification module 250, and a color module 260. All, or some, of the modules 210-260, communicate with each other, for example, via a network coupling, shared memory, and the like. Each module of modules 210-260 can be implemented as a single module, combined into other modules, or further subdivided into multiple modules. Other modules not pertinent to example embodiments can also be included, but are not shown.

The access module 210 receives or accesses a set of images (e.g., frames in a video stream). In some embodiments, the access module 210 receives the set of images directly from an image capture device of the client device 110. In some instances, an application or module of the client device 110 passes the set of images to the access module 210 for use in one or more of the methods described herein.

The coordinate module 220 converts images within the video stream to alternative coordinate representations. In some embodiments, the coordinate module 220 converts images to a set of cylindrical coordinate representations. The cylindrical coordinate representations may be color coordinate models which map colors within the image to a set of coordinates within the model indicating one or more values representative of the displayed pixel color.

The equalization module 230 performs histogram equalizations on cylindrical coordinate representations of the coordinate module 220. The equalization module 230 may determine a range of intensities for the cylindrical coordinate representations and eliminate values exceeding the range of intensities. In some embodiments, the equalization module 230 identifies gray values within the set of images, modifies one or more of the gray values to generate a color shift, and applies the color shift to one or more pixels within the set of images. The equalization module 230 may convert pixels within the set of images from a first color space to a second color space, identifying predetermined pixel value ranges, and modifying pixel values within the set of images in accordance with the predetermined pixel value ranges.

The location module 240 performs locating operations within the color extraction system 160. In various example embodiments, the location module 240 identifies and provides locations for one or more areas of interest and one or more regions of interest depicted within images of a video stream (e.g., one or more frames of a video stream). The areas of interest, identified by the location module 240, may be sized and shaped to include one or more object of interest or one or more color of interest. The areas of interest may be identified based on identifying one or more characteristics depicted within the image. In some embodiments, the location module 240 may be a portion of a face tracking module or system which identifies one or more facial characteristics.

The identification module 250 identifies colors of the cylindrical coordinate representations using an area of interest identified by the location module 240. In some embodiments, the identification module 250 identifies thresholds within the cylindrical coordinate representation, such as upper and lower thresholds for lightness values. The identification module 250 may remove pixel values exceeding the upper threshold and below the lower threshold to remove highlights and shadows from the set of images of the video stream. Although described herein as using cylindrical coordinate representations, it will be understood that the identification module 250 may use other color spaces or color coordinate representations, such as RGB or Lab color space.

The color module 260 determines the prevailing color of colors appearing within the area of interest identified by the location module 240. In some embodiments, the color module 260 applies the prevailing color to one or more pixels of the set of images of the video stream (e.g., pixels within the area of interest and pixels outside of the area of interest). In some instances, the color module 260 translates color ranges appearing in the set of images of the video stream into uniform color ranges.

Figure 3:
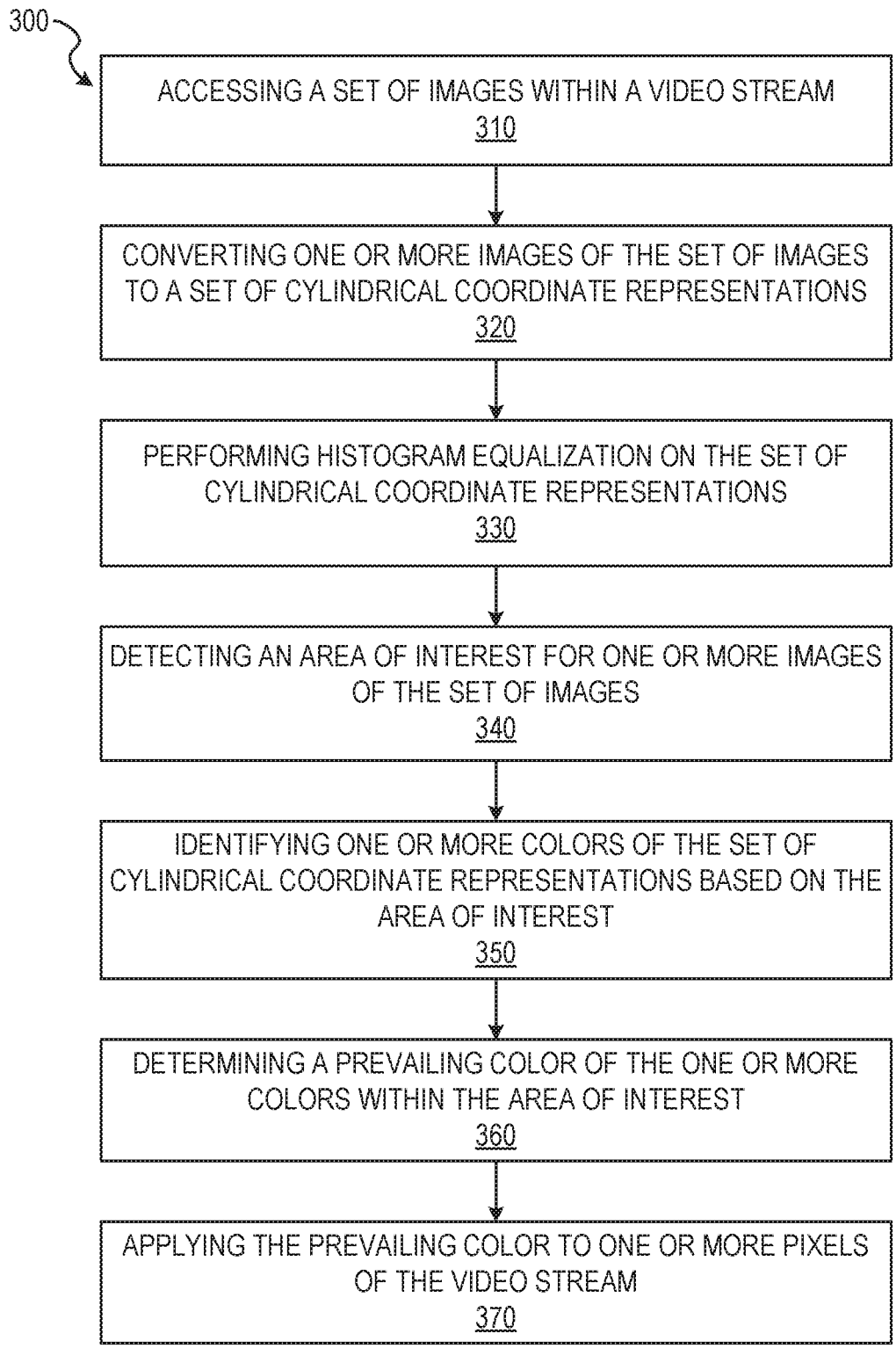
FIG. 3 is a flow diagram illustrating an example method for segmenting images within a video stream to extract and modify colors of the video stream based on the segmentation, according to some example embodiments.

FIG. 3 depicts a flow diagram illustrating an example method 300 for segmenting portions of a video stream and extracting and modifying colors of the video stream based on the segmentation. The operations of method 300 may be performed by components of the color extraction system 160, and are so described below for purposes of illustration.

In operation 310, the access module 210 receives or otherwise accesses a set of images of a video stream. In some embodiments, the access module 210 accesses the video stream captured by the image capture device associated with the client device 110 and presented on the user interface of the image modification application. The access module 210 may include the image capture device as a portion of hardware comprising the access module 210. In these embodiments, the access module 210 directly receives the video stream captured by the image capture device. In some instances, the access module 210 passes all or a part of the video stream (e.g., the set of images comprising the video stream) to one or more modules of the color extraction system 160, as described below in more detail.

In operation 320, the coordinate module 220 converts one or more images of the set of images to a set of cylindrical coordinate representations. In some embodiments, the one or more images are converted to a hue, saturation, and lightness (HLS) coordinate representation (e.g., HSV color space cylinder). In some instances, the one or more images are converted to a hue, saturation, and value (HSV) coordinate representation. The HSV coordinate representation may be divided into a plurality of segments. Each segment contains a set of similar colors. Pixels to be processed by the method 300 are mapped to corresponding segments of the HSV coordinate representation. Each segment of the cylinder stores a sum of hues, a sum of saturations, and a sum of values. The segments also contain a number of pixels mapped to the segment. For example, each segment may include hueSum[V][H], saturationSum[V][H], valueSum[V][H], and count[V][H] arrays. In some embodiments, two dimensional arrays are used to accumulate data from the one or more images of the video stream. Although described using the HSV color space cylinder, the coordinate module 220 may convert the one or more images to other coordinate representations which may or may not be cylindrical coordinate representations. In some embodiments, the coordinate module 220 converts the one or more images to a Lab coordinate representation.

In operation 330, the equalization module 230 performs histogram equalization on the set of cylindrical coordinate representations. In some embodiments, the histogram equalization is performed by one or more operations for adaptive histogram equalization (AHE) determining a set of histograms corresponding to sections of an image of the video stream. In some instances, the histogram equalization is performed by one or more operations for contrast limited adaptive histogram equalization (CLAHE) determining a set of contrast limited histograms for sections of an image of the video stream. In some embodiments, as described below with respect to FIG. 6, the histogram equalization may be performed using operations other than AHE and CLAHE operations.

In some embodiments, the operation 320 is performed after all color correcting and histogram equalization operations have been performed, such as the operation 330 described above. In these instances, the histogram equalization and color correction operations may improve the image quality prior to conversion of the image into the color coordinate representation.

In operation 340, the location module 240 detects an area of interest for one or more images of the set of images. In some embodiments, the location module 240 determines the area of interest based on identifying one or more characteristics depicted within the image. For example, the one or more characteristics may be landmarks on a face, edges of an object, a pattern of an object, or other characteristics which define or otherwise enable identification of a type of object and an area in which the object is located within the one or more images. In some embodiments, the object of interest and parameters for the area of interest may be predetermined. For example, where the object of interest is related to a face, the location module 240 may contain face tracking or facial landmark identification functionality to identify landmarks or other facial features depicted in the one or more images. In some instances, the area of interest is a portion of skin depicted within the face under an eye. In these embodiments, the location module 240 may identify facial landmarks proximate to the skin depicted under the eye. The location module 240 may then determine a border for the area of interest.

In operation 350, identification module 250 identifies one or more colors of the set of cylindrical coordinate representations based on the area of interest. The identification module 250 may identify one or more segments of the HSV coordinate representation which are associated with one or more pixels of the area of interest. In some embodiments, the one or more segments (e.g., column of the HSV coordinate representation) identified may contain the most pixels mapped between the HSV coordinate representation and the area of interest.

In some embodiments, in performing the operation 350, the identification module 250 removes, equalizes, or otherwise adjusts for variations in lighting prior to or during the color identification. In these embodiments, the identification module 250 identifies an upper threshold for a lightness value within the set of cylindrical coordinate representations. The identification module 250 determines one or more pixel values exceeding the upper threshold, and removes the one or more pixel values exceeding the upper threshold. In these instances, by removing pixel values exceeding the upper threshold, the identification module 250 removes pixel values representing highlights within the image. This may eliminate or reduce the effect of a bright, directional light or washed out portion within the one or more images of the video stream.

In some embodiments, the identification module 250, performing the operation 350 removes, equalizes, or otherwise adjusts for variations of shadows within the one or more images of the video stream. The identification module 250 identifies a lower threshold for the lightness value within the set of cylindrical coordinate representations. The identification module 250 determines one or more pixel values below the lower threshold. The identification module 250 removes the one or more pixel values below the lower threshold.

In operation 360, the color module 260 determines a prevailing color of the one or more colors within the area of interest. In some embodiments, the color module 260 calculates the average hue, saturation, and value found within the one or more segments (e.g., the column of the HSV coordinate representation). The resulting color, represented by the average hue, saturation, and value, may be identified as the prevailing color.

In some embodiments, the color module 260 determines the prevailing color as a color within the set of cylindrical coordinate representations by identifying a segment of the set of cylindrical coordinate representations which represents a color within the area of interest. The identified segment has the highest pixel count for pixels of the area of interest mapped to the selected segment. Once identified, the prevailing color may be output as the segment of the cylindrical coordinate representation. In some instances, the color module 260 converts the prevailing color from the cylindrical coordinate representation to a color space associated with the set of images of the video stream.

In operation 370, the color module 260 applies the prevailing color to one or more pixels of the set of images of the video stream. In some embodiments, the color module 260 applies the prevailing color by identifying one or more portions of interest of a second set of images of the video stream. For example, where the prevailing color is a corrected color of a face depicted in the video stream, the color module 260 may apply the prevailing color to one or more pixels of the face depicted in the second portion of the video stream.

Figure 4:
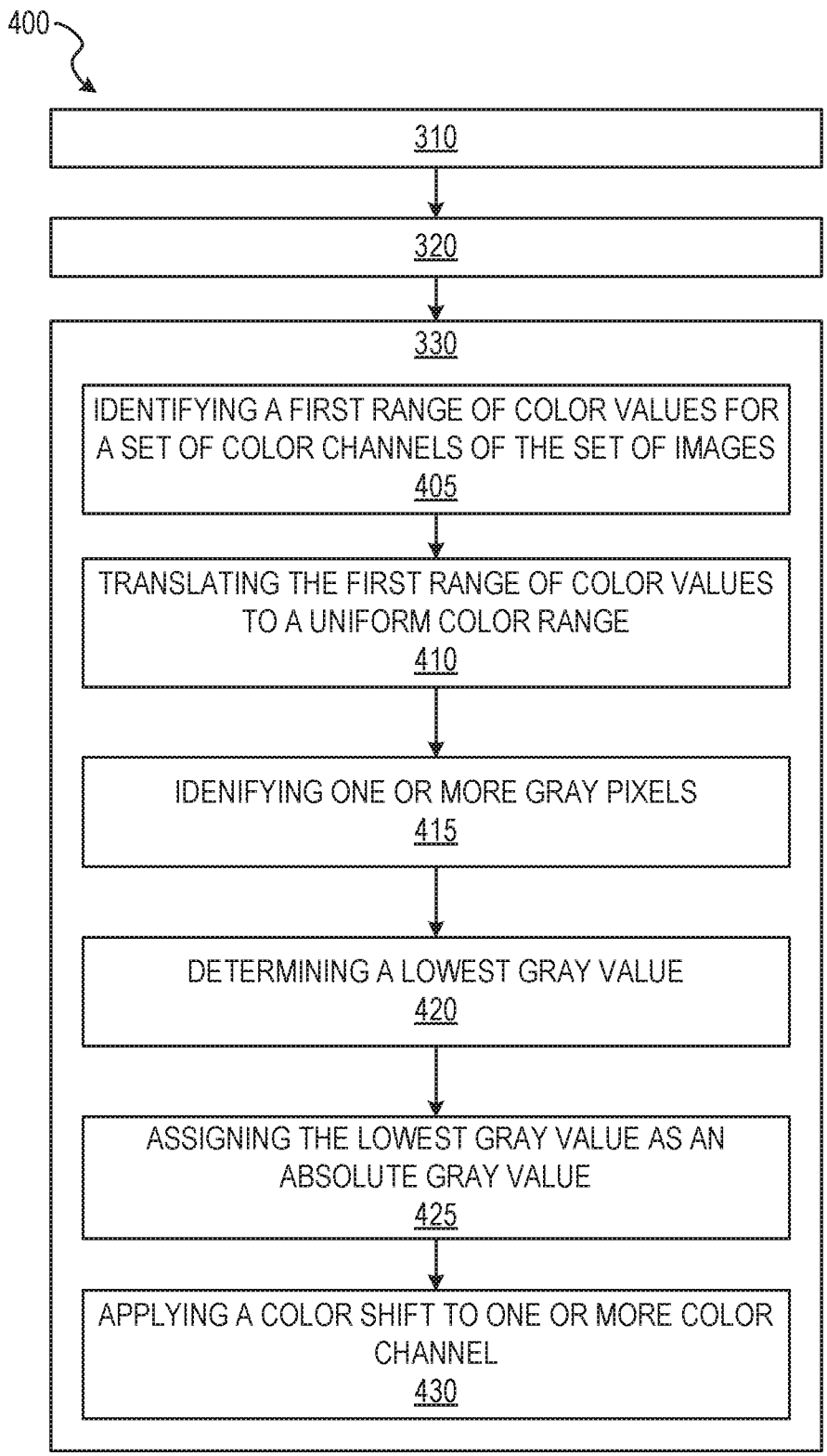
FIG. 4 is a flow diagram illustrating an example method for segmenting images within a video stream to extract and modify colors of the video stream based on the segmentation, according to some example embodiments.

FIG. 4 shows a flow diagram illustrating an example method 400 for segmenting portions of a video stream and modifying one or more segmented portions of the video stream. The operations of method 400 may be performed by components of the color extraction system 160. In some instances, certain operations of the method 400 may be performed using one or more operations of the method 300 or as sub-operations of one or more operations of the method 300, as will be explained in more detail below.

In some embodiments, in performing histogram equalization in the operation 330, the equalization module 230 performs operation 405. In the operation 405, the equalization module 230 identifies a first range of color values for a set of color channels of the set of images. A color displayed in a pixel is the product of a set of component colors being displayed at varying intensities. A color channel is a depiction of an image using a single component color of the set of component colors. For example, colors of an image may be displayed by pixels having varying combinations of intensities for component colors of red, blue, and green. The red values for the pixels thus form a red channel.

The equalization module 230 determines the range of intensities for the color channels (e.g., the first range of color values) by identifying a minimum value and a maximum value for each color channel. The equalization module 230 may then compare the range of intensities to a predetermined color range (e.g., a uniform color range including a uniform range for intensity values). Where the equalization module 230 determines the range of intensities does not match the predetermined color range, the equalization module 230 performs the operation 410.

In operation 410, the color module 260 translates the first range of color values to a uniform color range. In some embodiments, the color module 260 translates the first range of color values into a uniform color range of zero to two-hundred fifty-five. In some instances, the color module 260 translates the first range of color values (e.g., all of the color values for a color in a specified color channel) according to equation 1:

$$newValue = \left[\frac{oldValue - \min(oldValues)}{\max(oldValues) - \min(oldValues)}\right] * 255$$

The color module 260 may translate color values for each of the color channels of the set of color channels, thereby modifying the one or more images of the video stream, generating uniform images. For example, values [20, 48, 120, 250] are converted into values [0, 31, 110, 255].

In operation 415, the equalization module 230 identifies one or more gray pixels within the set of cylindrical coordinate representations. The gray pixels may be identified based on intensity values for pixels representing colors within the images. In some instances, the gray pixels are identified based on identifying one or more pixels within a predetermined type of object. For example, the equalization module 230 may identify one or more pixels located in a sclera of an eye identified by the location module 240. Although described with specific examples, it will be understood that the equalization module 230 may identify one or more gray pixels in any suitable manner. In some embodiments, the equalization module 230 may determine the one or more gray pixels using equation 2:

$$D_G = |red - green| + |green - blue| + |blue - red|$$

Pixels which are more gray have a lower value of $D_G$ resulting from the equation 2.

In operation 420, the equalization module 230 determines a lowest gray value (e.g., $D_G$) among the one or more gray pixels. The equalization module 230 may determine the lowest gray value from the values generated using equation 2. In some instances, the lowest gray value is determined based on direct comparison of each gray value generated using equation 2. The equalization module 230 may compare each of the gray values to determine a lowest value among the pixels.

In operation 425, the equalization module 230 assigns the lowest gray value as an absolute gray value to generate a color shift. In generating the color shift, the equalization module 230 determines a value to apply to each pixel within the uniform images. In some embodiments, assigning the lowest gray value as the absolute gray value generates a color shift by determining new values for each color value for the pixel determined to be the absolute gray. In some embodiments, the equalization module 230 determines new color values using equation 3:

$$newRed = newGreen = newBlue = \frac{oldRed + oldGreen + oldBlue}{3}$$

In some embodiments, the absolute gray value is the rounded result of the average of the red, green, and blue values for the pixel at the lowest gray value. As shown in the expression above, a new red value, a new green value, and a new blue value may be generated for the pixel corresponding to absolute gray within the image. The equalization module 230 may then determine a difference for each color value by subtracting the old value from the new value determined in equation 3. In these embodiments, the equalization module 230 determines a difference value to be applied to each color channel of the image. For example, where the image has a red color channel, a green color channel, and a blue color channel, the equalization module 230 determines a red difference value, a green difference value, and a blue difference value. Each difference value calculated for a color channel may act as the color shift value.

In operation 430, the equalization module 230 applies the color shift to one or more color channel of the set of color channels to generate one or more color shifted images. In some embodiments, the equalization module 230 generates the one or more color shifted images by applying a color shift value of a color channel to each pixel value of the color channel within the image. For example, the equalization module 230 may apply the red difference value to the red channel by adding the red difference value to each red pixel value within the image. Similarly, where the image contains green and blue channels, the equalization module 230 may apply the green difference value to each green pixel value and the blue difference value to each blue pixel value of the image. Although described with respect to red, blue, and green channels, it will be understood that the equalization module 230 may calculate difference values and effect a color shift on any suitable color channels for an image.

Figure 5:
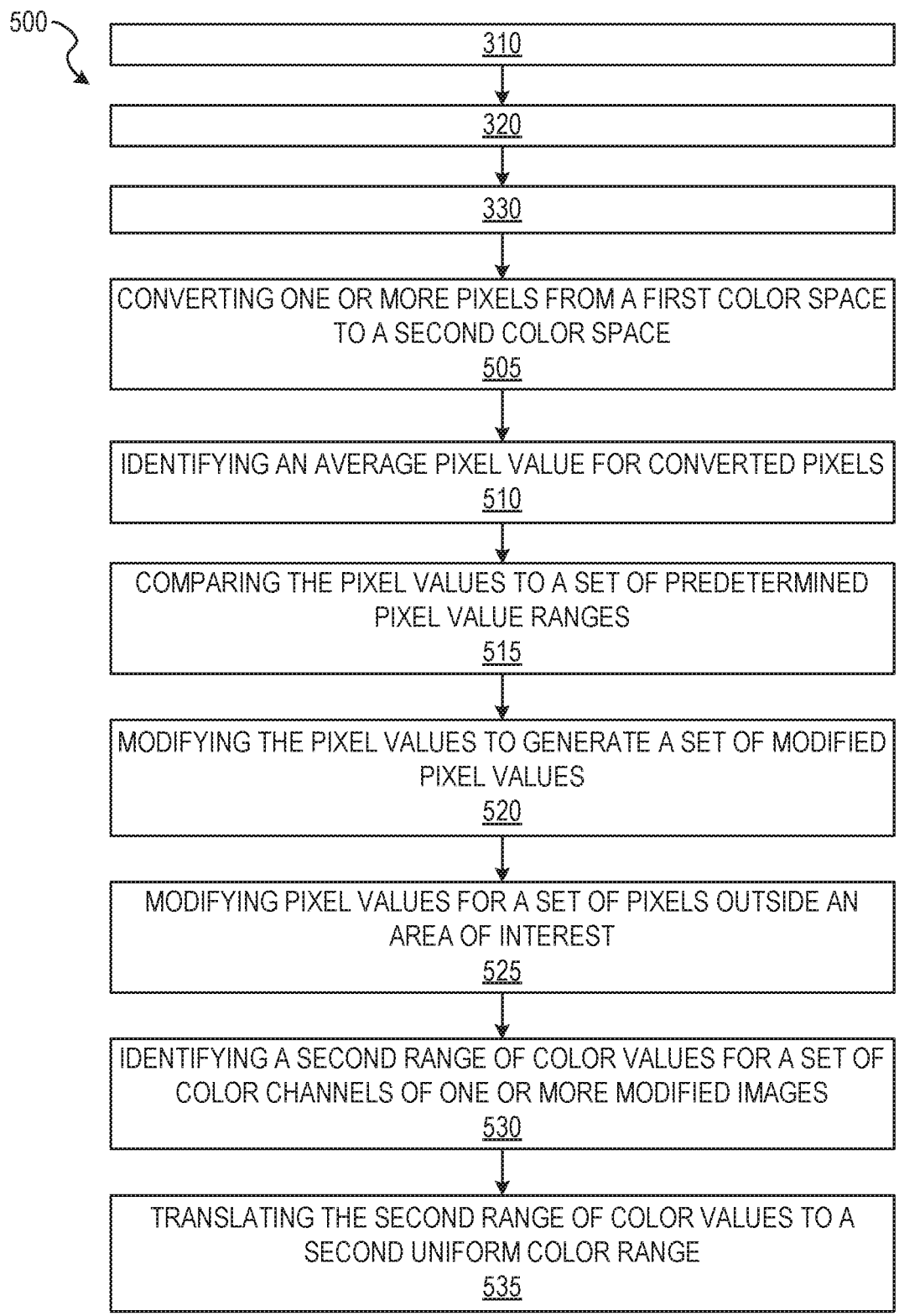
FIG. 5 is a flow diagram illustrating an example method for segmenting images within a video stream to extract and modify colors of the video stream based on the segmentation, according to some example embodiments.

FIG. 5 depicts a flow diagram illustrating an example method 500 of extracting and modifying colors within a video stream using the color extraction system 160. The operations of method 500 may be performed by components of the color extraction system 160. In some instances, certain operations of the method 500 may be performed using one or more operations of the methods 300 or 400, in one or more of the described embodiments, or as sub-operations of one or more operations of the methods 300 or 400, as will be explained in more detail below.

In some embodiments as shown in FIG. 5, the method 500 may be performed initially by performing operations 310, 320, and 330 and operations 405-430. In operation 505, the equalization module 230 converts one or more pixels within the area of interest from a first color space to a second color space to generate one or more converted pixels. A color space may be understood as an organization of colors allowing for reproducible representations of a color. The color space of a digital image (e.g., a frame of the video stream) is a model for representing and depicting colors within a display device using one or more values within an individual pixel. A color space may include a set of color values for each pixel, combinations of which generate differing colors. Color spaces may include red, green, and blue (RGB) color space; a standard RGB (sRGB) color space; cyan, magenta, yellow, and key (CMYK) color space; or any other suitable color space.

In some embodiments, the equalization module 230 converts the one or more pixels within the area of interest from the first color space to the second color space using a profile connection space, where the first color space and the second color space are mapped to one another based on a predetermined profile. For example, the equalization module 230 may convert the first color space (e.g., RGB color space) to the second color space (e.g., CMYK color space) using a predetermined profile. In some instances, the equalization module 230 converts one or more pixels from the first color space to the second color space using gamut mapping and absolute colorimetric, relative colorimetric, or perceptual and saturation rendering intents. In these instances, the equalization module 230 compensates for colors within the first color space which are outside the gamut of the second color space.

In operation 510, the equalization module 230 identifies average pixel values for the one or more converted pixels. In some embodiments, the average pixel value is calculated for all of the values representing the pixel. In some instances, the equalization module 230 calculates average color values for each color channel within the second color space. For example, where the second color space is the CMYK color space, the equalization module 230 may calculate an average cyan color value, magenta color value, yellow color value, and key value (e.g., a black value) for each pixel within the area of interest.

In operation 515, the equalization module 230 compares the pixel values to a set of predetermined pixel value ranges. In some embodiments, the set of predetermined pixel value ranges includes a pixel value range for each color channel of the second color space for the image. The set of predetermined pixel value ranges may be programmed into the equalization module 230. In some instances the set of predetermined pixel value ranges is selected from a plurality of sets of predetermined pixel value ranges where each set of pixel value ranges is associated with an object type for an object of interest within the area of interest. For example, where the area of interest is a portion of a face, depicting skin under an eye, the object of interest may be the skin under the eye. The equalization module 230 may determine a set of predetermined pixel value ranges suitable for the skin tone, and compare the pixel values to the selected set of predetermined pixel value ranges. For example, in some instances, a skin tone or range of skin tones within the second color space (e.g., CMYK color space) may be associated with a range of values including the cyan value being less than two percent, and the magenta value subtracted from the yellow value may be between five and fifteen percent.

In operation 520, the equalization module 230 modifies the pixel values to generate a set of modified pixel values within the set of predetermined pixel value ranges. In some embodiments, the equalization module 230, after comparing the pixel values to the set of predetermined pixel value ranges, may modify the pixel values of pixels within the area of interest to be within the set of predetermined pixel value ranges. In some embodiments, the set of modified values may include variations corresponding to differences in the pixel values prior to modification but within the set of predetermined pixel value ranges.

In operation 525, the color module 260 modifies pixel values for a set of pixels outside of the area of interest based on the set of modified pixel values to generate one or more modified images. In some embodiments, the color module 260 modifies pixel values for pixels identified by the identification module 250 as being associated with one or more of the area of interest or the object of interest. For example, where the area of interest includes pixels depicting skin and the object of interest is skin below the eye, the identification module 250 may identify one or more additional pixels representing skin that are outside of the area of interest. The color module 260 may then modify pixel values associated with the one or more additional pixels. In some instances, the identification module 250 may identify the one or more additional pixels based on initial pixel values being within a predetermined range of the initial values for the pixels within the area of interest. In some embodiments, the identification module 250 identifies the one or more additional pixels using landmarks. For example, where the pixels within the area of interest are associated with a face, the identification module 250 may include facial tracking functionality capable of identifying one or more landmarks within the face. The identification module 250 may identify the one or more additional pixels outside the area of interest using facial landmarks.

In some instances, the color module 260 modifies the pixel values of the set of pixels outside of the area of interest, where the set of pixels includes all of the pixels within the image which are outside of the area of interest. In these embodiments, one or more of the equalization module 230 and the color module 260 modify the pixels outside of the area of interest in the same manner as those within the area of interest, based on the modification of the pixels within the area of interest. The equalization module 230 may determine a difference between initial pixel color values of the second color space for each of the pixels within the area of interest and may calculate a difference between the initial pixel color value and the value of the set of modified pixel values. One or more of the equalization module 230 and the color module 260 may then apply the difference (e.g., add the difference) to the set of pixels outside of the area of interest.

In operation 530, the equalization module 230 identifies a second range of color values for a set of color channels of the one or more modified images. In some embodiments, the operation 530 may be performed similarly to or the same as the operation 405, discussed above with respect to the FIG. 6.

In operation 535, the color module 260 translates the second range of color values to a second uniform color range. In some embodiments, the operation 535 is performed similarly to or the same as the operation 410.

Figure 6:
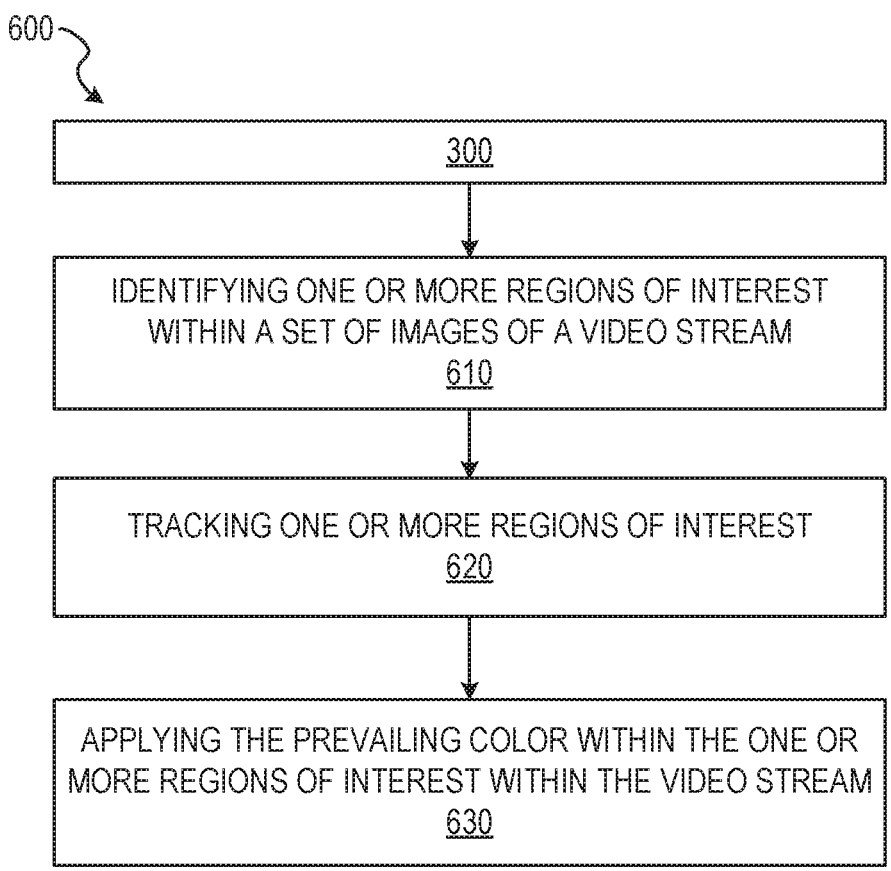
FIG. 6 is a flow diagram illustrating an example method for segmenting images within a video stream to extract and apply colors to the video stream, according to some example embodiments.
Figure 7:
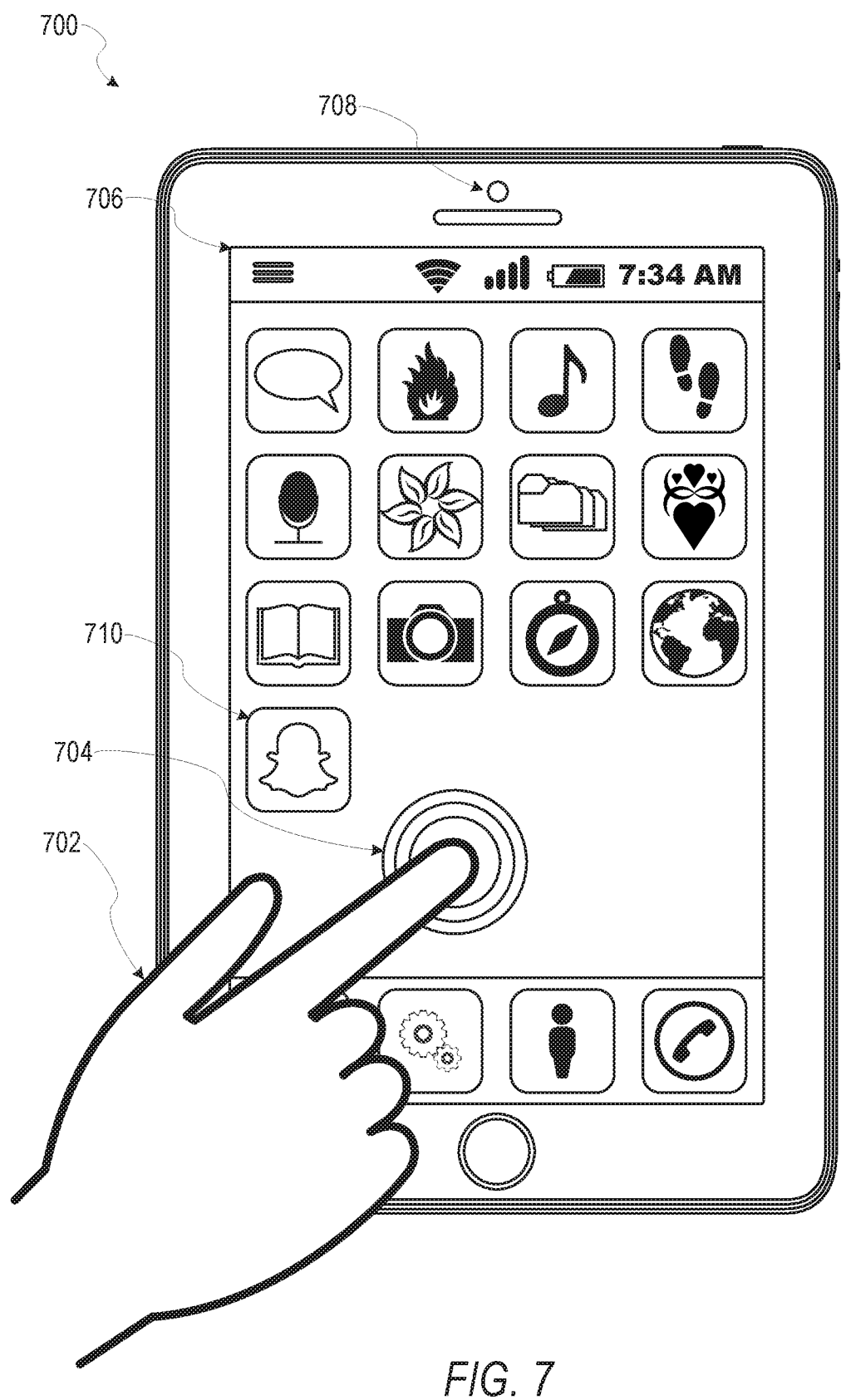
FIG. 7 is a user interface diagram depicting an example mobile device and mobile operating system interface, according to some example embodiments.
Figure 8:
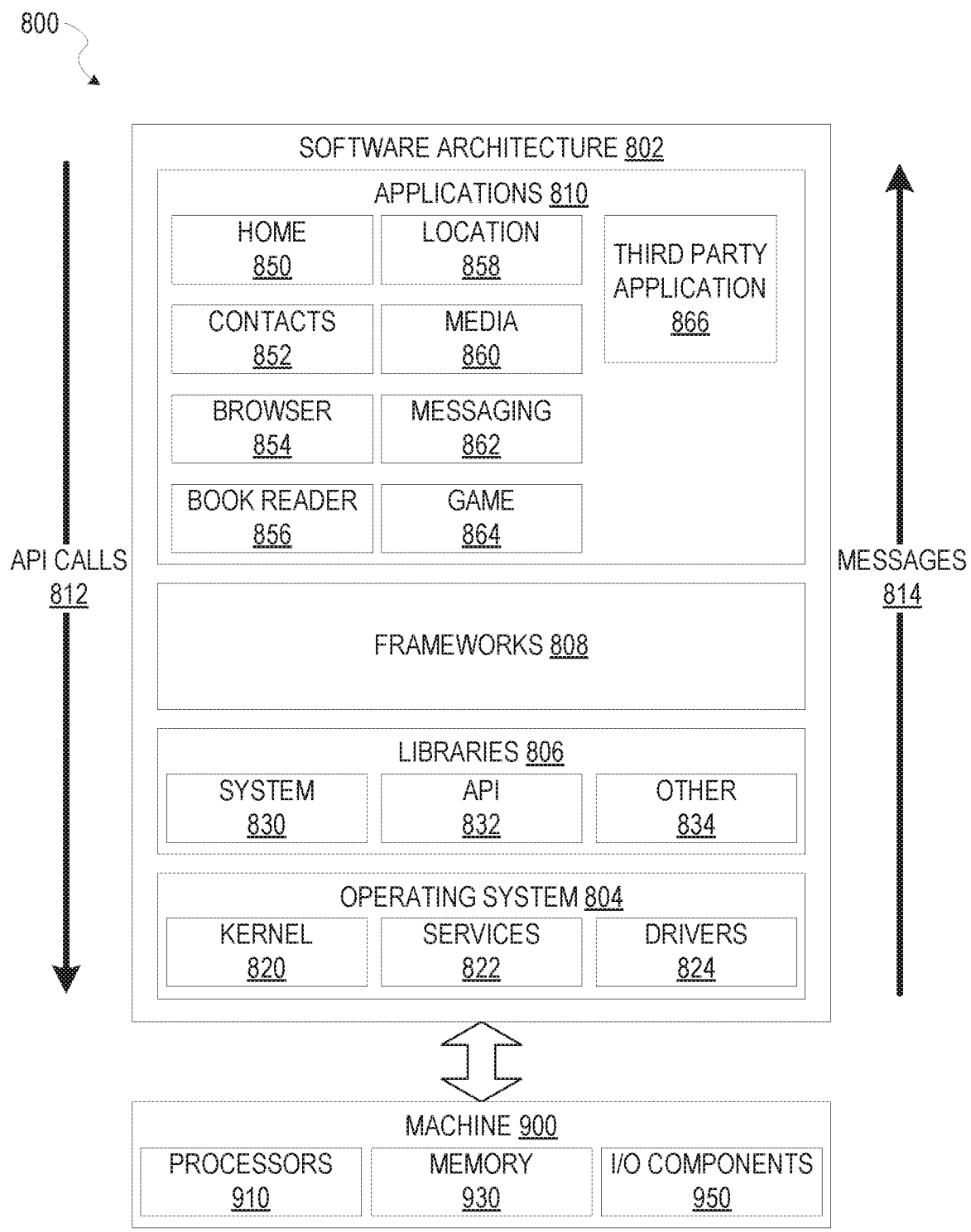
FIG. 8 is a block diagram illustrating an example of a software architecture that may be installed on a machine, according to some example embodiments.
Figure 9:
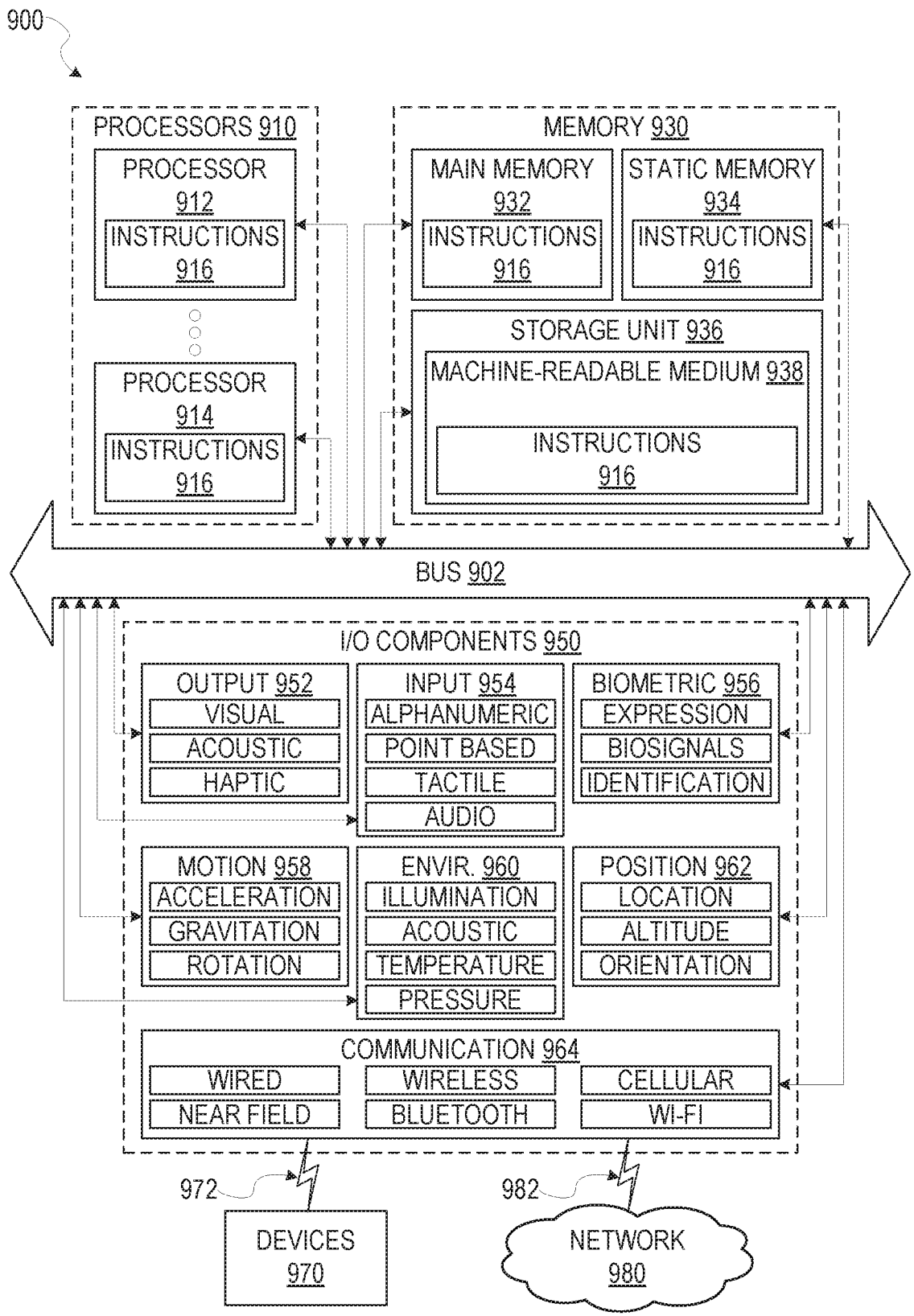
FIG. 9 is a block diagram presenting a diagrammatic representation of a machine in the form of a computer system within which a set of instructions may be executed for causing the machine to perform any of the methodologies discussed herein, according to an example embodiment.

FIG. 6 shows a flow diagram illustrating an example method 600 for modifying colors of images within a video stream. The operations of method 600 may be performed by components of the color extraction system 160. In some instances, certain operations of the method 600 may be performed using one or more operations of the method 300, 400, or 500 or as sub-operations of one or more operations of the method 300, 400, or 500, as will be explained in more detail below.

In operation 610, the location module 240 identifies one or more regions of interest within the set of images of the video stream. In some instances, the location module 240 may identify the regions of interest in a manner similar to or the same as the operation 340 identifying the area of interest. The regions of interest may be areas of the set of images distinct from the areas of interest. In some embodiments, the regions of interest include at least a portion of the areas of interest. In some instances, the location module 240 identifies the one or more regions of interest based facial recognition operations. The regions of interest, in these embodiments, are portions of a face depicted within the video stream. For example, the regions of interest may be pixels depicting skin, an iris, hair, or other features of a face or associated with a face. Where the area of interest is a portion of skin below the eye of the face detected within the video stream, the region of interest may be any pixels depicting skin color within the video stream.

In some embodiments, the location module 240 determines the region of interest based on an original color range of pixels associated with the area of interest. The location module 240 may determine one or more pixels within the video stream which are within a predetermined range (e.g., variation of color) of the area of interest. The location module 240 may identify the one or more pixels as the one or more regions of interest.

In operation 620, the location module 240 tracks one or more regions of interest. The location module 240 may employ one or more tracking operations to track the one or more regions of interest across one or more frame (e.g., the set of images) of the video stream. In some embodiments, where the regions of interest are part of or associated with a face, the location module 240 includes facial tracking functionality to identify and track facial landmarks across the set of images of the video stream.

In operation 630, the color module 260 applies the prevailing color within the one or more regions of interest within the set of images of the video stream. In some embodiments, the operation 630 applies the prevailing color to the one or more regions of interest similarly to or the same as the operation 370.

Modules, Components, and Logic

Certain embodiments are described herein as including logic or a number of components, modules, or mechanisms. Modules can constitute hardware modules. A "hardware module" is a tangible unit capable of performing certain operations and can be configured or arranged in a certain physical manner. In various example embodiments, computer systems (e.g., a standalone computer system, a client computer system, or a server computer system) or hardware modules of a computer system (e.g., at least one hardware processor, a processor, or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented modules that operate to perform operations or functions described herein. As used herein, "processor-implemented module" refers to a hardware module implemented using processors.

Similarly, the methods described herein can be at least partially processor-implemented, with a particular processor or processors being an example of hardware. For example, at least some of the operations of a method can be performed by processors or processor-implemented modules. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Applications

FIG. 10 illustrates an example mobile device 1000 executing a mobile operating system (e.g., IOS™, ANDROID™, WINDOWS® Phone, or other mobile operating systems), consistent with some embodiments. In one embodiment, the mobile device 1000 includes a touch screen operable to receive tactile data from a user 1002. For instance, the user 1002 may physically touch 1004 the mobile device 1000, and in response to the touch 1004, the mobile device 1000 may determine tactile data such as touch location, touch force, or gesture motion. In various example embodiments, the mobile device 1000 displays a home screen 1006 (e.g., Springboard on IOST™) operable to launch applications or otherwise manage various aspects of the mobile device 1000. In some example embodiments, the home screen 1006 provides status information such as battery life, connectivity, or other hardware statuses. The user 1002 can activate user interface elements by touching an area occupied by a respective user interface element. In this manner, the user 1002 interacts with the applications of the mobile device 1000. For example, touching the area occupied by a particular icon included in the home screen 1006 causes launching of an application corresponding to the particular icon.

The mobile device 1000, as shown in FIG. 10, includes an imaging device 1008. The imaging device may be a camera or any other device coupled to the mobile device 1000 capable of capturing a video stream or one or more successive images. The imaging device 1008 may be triggered by the color extraction system 160 or a selectable user interface element to initiate capture of a video stream or succession of images and pass the video stream or succession of images to the color extraction system 160 for processing according to the one or more methods described in the present disclosure.

Many varieties of applications (also referred to as "apps") can be executing on the mobile device 1000, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1000 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1000 includes a social messaging app 1010 such as SNAPCHAT® that, consistent with some embodiments, allows users to exchange ephemeral messages that include media content. In this example, the social messaging app 1010 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present invention.

In some embodiments, an ephemeral message system may include messages having ephemeral video clips or images which are deleted following a deletion trigger event such as a viewing time or viewing completion. In such embodiments, a device implementing the color extraction system 160 may identify, track, extract, and modify an area of interest and the color depicted therein within the ephemeral video clip, as the ephemeral video clip is being captured by the device and transmit the ephemeral video clip to another device using the ephemeral message system.

Software Architecture

FIG. 11 is a block diagram 1100 illustrating an architecture of software 1102, which can be installed on the devices described above. FIG. 11 is merely a non-limiting example of a software architecture, and it will be appreciated that many other architectures can be implemented to facilitate the functionality described herein. In various embodiments, the software 1102 is implemented by hardware such as machine a 1200 of FIG. 12 that includes processors 1210, memory 1230, and I/O components 1250. In this example architecture, the software 1102 can be conceptualized as a stack of layers where each layer may provide a particular functionality. For example, the software 1102 includes layers such as an operating system 1104, libraries 1106, frameworks 1108, and applications 1110. Operationally, the applications 1110 invoke application programming interface (API) calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphic user interface (GUI) functions, high-level resource management, high-level location services, and so forth. The frameworks 1108 can provide a broad spectrum of other APIs that can be utilized by the applications 1110, some of which may be specific to a particular operating system or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as a third party application 1166. According to some embodiments, the applications 1110 are programs that execute functions defined in the programs. Various programming languages can be employed to create the applications 1110, structured in a variety of manners, such as object-oriented programming languages (e.g., Objective-C, Java, or C++) or procedural programming languages (e.g., C or assembly language). In a specific example, the third party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 1166 can invoke the API calls 1112 provided by the operating system 1104 to facilitate functionality described herein.

Example Machine Architecture and Machine-Readable Medium

FIG. 12 is a block diagram illustrating components of a machine 1200, according to some embodiments, able to read instructions (e.g., processor executable instructions) from a machine-readable medium (e.g., a non-transitory machine-readable storage medium) and perform any of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any of the methodologies discussed herein can be executed. In alternative embodiments, the machine 1200 operates as a standalone device or can be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any of the methodologies discussed herein.

In various embodiments, the machine 1200 comprises processors 1210, memory 1230, and I/O components 1250, which can be configured to communicate with each other via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 1212 and a processor 1214 that may execute the instructions 1216. The term "processor" is intended to include multi-core processors that may comprise two or more independent processors (also referred to as "cores") that can execute instructions contemporaneously. Although FIG. 12 shows multiple processors, the machine 1200 may include a single processor with a single core, a single processor with multiple cores (e.g., a multi-core processor), multiple processors with a single core, multiple processors with multiples cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1238 on which are stored the instructions 1216 embodying any of the methodologies or functions described herein. The instructions 1216 can also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various embodiments, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown in an example embodiment to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by processors of the machine 1200 (e.g., processors 1210), cause the machine 1200 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The I/O components 1250 are grouped according to functionality merely for simplifying the following discussion, and the grouping is in no way limiting. In various example embodiments, the I/O components 1250 include output components 1252 and input components 1254. The output components 1252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 include acceleration sensor components (e.g., accelerometer), gravitation sensor components, rotation sensor components (e.g., gyroscope), and so forth. The environmental components 1260 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, communication components 1264 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1270 may be another machine or any of a wide variety of peripheral devices (e.g., a peripheral device coupled via a Universal Serial Bus (USB)).

Moreover, in some embodiments, the communication components 1264 detect identifiers or include components operable to detect identifiers. For example, the communication components 1264 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1264, such as location via Internet Protocol (IP) geo-location, location via WI-FI® signal triangulation, location via detecting a BLU-ETOOTH® or NFC beacon signal that may indicate a particular location, and so forth.

Transmission Medium

In various example embodiments, portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, in other example embodiments, the instructions 1216 are transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1238 is non-transitory (in other words, not having any transitory signals) in that it does not embody a propagating signal. However, labeling the machine-readable medium 1238 "non-transitory" should not be construed to mean that the medium is incapable of movement; the medium should be considered as being transportable from one physical location to another. Additionally, since the machine-readable medium 1238 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
accessing, by one or more processors, a first image of a video stream depicting an object;
generating a uniform color range using a first range of color values of a color channel of the first image, the generating the uniform color range comprising translating the first range of color values of the color channel of the first image to the uniform color range, the translating comprising:
  computing a difference value between an old color value of a color in the color channel and a minimum of old color values of the color in the color channel;
  computing a ratio of the difference value to a difference between a maximum of the old color values and the minimum of the old color values; and computing a new color value for the first range of color values by applying a multiplication factor to the ratio; and determining one or more gray pixels in the first image based on a plurality of absolute values, a first of the plurality of absolute values corresponding to a first difference between a first color and a second color, a second of the plurality of absolute values corresponding to a second difference between the second color and a third color.

2. The method of claim 1, further comprising:
computing a gray value for the one or more gray pixels as a function of:
the first absolute value of the first difference, the first color comprising a red color and the second color comprising a green color;
the second absolute value of the second difference, the third color comprising a blue color; and
a third absolute value of a third difference between the blue color and the red color.

3. The method of claim 2, further comprising accumulating the first, second and third absolute values to compute the gray value.

4. The method of claim 3, further comprising comparing the gray value to a threshold to identify the one or more gray pixels.

5. The method of claim 1, further comprising accumulating the plurality of absolute values to compute a gray value for the one or more gray pixels.

6. The method of claim 1, further comprising converting the first image to a hue, saturation, and value (HSV) coordinate representation, the HSV coordinate representation comprising a plurality of segments, each of the segments including a hue sum array, a saturation sum array, a value sum array and a count array.

7. The method of claim 6, wherein the hue sum array stores a sum of hues, wherein the saturation sum array stores a sum of saturations, the value sum array stores a sum of values, and the count array stores a total number of pixels mapped to the respective segment.

8. The method of claim 1, further comprising:
generating a message for transmission to a second user device comprising a video clip; and
automatically deleting the message transmitted to the second user device in response to a deletion trigger event that is a function of viewing time or viewing completion at the second user device.

9. The method of claim 1 further comprising:
identifying an upper threshold for a lightness value within a set of cylindrical coordinate representations of the first image;
determining one or more pixel values exceeding the upper threshold; and
removing the one or more pixel values exceeding the upper threshold.

10. The method of claim 1 further comprising:
identifying a lower threshold for a lightness value within a set of cylindrical coordinate representations of the first image;
determining one or more pixel values which are below the lower threshold; and
removing the one or more pixel values below the lower threshold.

11. The method of claim 1 further comprising automatically deleting a message transmitted to a given user device in response to a deletion trigger event that is a function of viewing time or viewing completion at the given user device.

12. The method of claim 1 further comprising:
converting the first image to a hue, saturation and value (HSV) coordinate representation, wherein the HSV coordinate representation is divided into a plurality of segments, a first segment of the plurality of segments includes a set of similar colors for a set of pixels of the first image, the first segment storing a sum of hues, a sum of saturations, and a sum of values for the set of pixels of the first image.

13. A system, comprising:
one or more processors; and
a non-transitory machine-readable storage medium storing processor-executable instructions that, when executed by the one or more processors, cause the one or more processors to perform operations comprising:
accessing a first image of a video stream depicting an object;
generating a uniform color range using a first range of color values of a color channel of the first image, generating the uniform color range comprises translating the first range of color values of the color channel of the first image to the uniform color range, the translating comprising:
computing a difference value between an old color value of a color in the color channel and a minimum of old color values of the color in the color channel;
computing a ratio of the difference value to a difference between a maximum of the old color values and the minimum of the old color values; and
computing a new color value for the first range of color values by applying a multiplication factor to the ratio; and
determining one or more gray pixels in the first image based on a plurality of absolute values, a first of the plurality of absolute values corresponding to a first difference between a first color and a second color, a second of the plurality of absolute values corresponding to a second difference between the second color and a third color.

14. The system of claim 13, wherein the operations further comprise:
computing a gray value for the one or more gray pixels as a function of:
the first absolute value of the first difference, the first color comprising a red color and the second color comprising a green color;
the second absolute value of the second difference, the third color comprising a blue color; and
a third absolute value of a third difference between the blue color and the red color.

15. The system of claim 13, wherein the operations further comprise accumulating the plurality of absolute values to compute a gray value.

16. The system of claim 13, wherein the operations further comprise:
detecting an area of interest for the first image positioned on a portion of the object depicted in the video stream;
modifying, during capture of a video clip, pixel values of first image in the video clip to be within a set of predetermined pixel value ranges;
computing a prevailing color of a portion of the video clip;
generating a message for transmission to a second user device comprising the video clip; and automatically deleting the message transmitted to the second user device in response to a deletion trigger event that is a function of viewing time or viewing completion at the second user device.

17. A non-transitory machine-readable storage medium storing processor-executable instructions that, when executed by a processor of a machine, cause the machine to perform operations comprising:
    accessing a first image of a video stream depicting an object;
    generating a uniform color range using a first range of color values of a color channel of the first image, generating the uniform color range comprises translating the first range of color values of the color channel of the first image to the uniform color range, the translating comprising:
    computing a difference value between an old color value of a color in the color channel and a minimum of old color values of the color in the color channel;
    computing a ratio of the difference value to a difference between a maximum of the old color values and the minimum of old color values; and
    computing a new color value for the first range of color values by applying a multiplication factor to the ratio; and
    determining one or more gray pixels in the first image based on a plurality of absolute values, a first of the plurality of absolute values corresponding to a first difference between a first color and a second color, a second of the plurality of absolute values corresponding to a second difference between the second color and a third color.

18. The non-transitory machine-readable storage medium of claim 17, wherein the operations further comprise:
    computing a gray value for the one or more gray pixels as a function of:
    the first absolute value of the first difference, the first color comprising a red color and the second color comprising a green color;
    the second absolute value of the second difference, the third color comprising a blue color; and
    a third absolute value of a third difference between the blue color and the red color.

19. The non-transitory machine-readable storage medium of claim 17, wherein the operations further comprise accumulating the plurality of absolute values to compute a gray value.

20. The non-transitory machine-readable storage medium of claim 17, wherein the operations further comprise:
    detecting an area of interest for the first image positioned on a portion of the object depicted in the video stream;
    modifying, during capture of a video clip, pixel values of first image in the video clip to be within a set of predetermined pixel value ranges;
    computing a prevailing color of a portion of the video clip;
    generating a message for transmission to a second user device comprising the video clip; and
    automatically deleting the message transmitted to the second user device in response to a deletion trigger event that is a function of viewing time or viewing completion at the second user device.

* * * * *